(12) United States Patent
Murakami

(10) Patent No.: US 7,889,386 B2
(45) Date of Patent: Feb. 15, 2011

(54) IMAGE PROCESSING APPARATUS AND METHOD FOR PROCESSING VECTOR IMAGE DATA UNITS OF BLOCKS

(75) Inventor: Waki Murakami, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1057 days.

(21) Appl. No.: 11/626,233

(22) Filed: Jan. 23, 2007

(65) Prior Publication Data

US 2007/0177177 A1    Aug. 2, 2007

(30) Foreign Application Priority Data

Jan. 27, 2006   (JP)   ............................. 2006-019264
Apr. 25, 2006   (JP)   ............................. 2006-121147

(51) Int. Cl.
*G06F 15/00* (2006.01)
*G06K 9/48* (2006.01)
*G06K 9/46* (2006.01)
*G06K 9/00* (2006.01)
*G09G 5/36* (2006.01)

(52) U.S. Cl. ...................... 358/1.9; 382/197; 382/203; 382/253; 345/557

(58) Field of Classification Search ................ 358/1.9; 382/197, 203, 253; 345/557
See application file for complete search history.

(56) References Cited

U.S. PATENT DOCUMENTS

| 5,594,860 | A  | * | 1/1997  | Gauthier ..................... 345/543 |
| 6,476,931 | B1 | * | 11/2002 | Aizikowitz et al. ........ 358/1.18 |
| 2004/0051884 | A1 | * | 3/2004 | Saxton ........................ 358/1.9 |
| 2006/0197999 | A1 |   | 9/2006 | Murakami |
| 2006/0227357 | A1 |   | 10/2006 | Murakami |
| 2008/0074685 | A1 | * | 3/2008 | Sakamoto ................... 358/1.9 |
| 2008/0273218 | A1 | * | 11/2008 | Kitora et al. ............... 358/1.13 |

FOREIGN PATENT DOCUMENTS

JP       4-170686  A       6/1992

* cited by examiner

*Primary Examiner*—Twyler L Haskins
*Assistant Examiner*—Fred Guillermety
(74) *Attorney, Agent, or Firm*—Canon U.S.A., Inc. I.P. Division

(57) ABSTRACT

An image processing apparatus processes vector image data in units of blocks. When vector image data associated with a first block satisfies a predetermined condition, the image processing apparatus stores the result of processing the vector image data associated with the first block. When vector image data associated with a second block matches the vector image data associated with the first block, the image processing apparatus outputs the result of processing the vector image data associated with the first block, which is stored therein.

14 Claims, 11 Drawing Sheets

FIG. 3

```
newpath
48 144 moveto
48, 16 lineto
134, 58 lineto
48, 144 lineto
closepath
100 setrgbcolor
fill
newpath
40 88 6 0 0 360 arc
15 setlinewidth
stroke
newpath
60 160 moveto
60 0 lineto
stroke
showpage
```

FIG. 4

```
newpath
16 16 moveto
16, 0 lineto
32, 0 lineto
16, 16 lineto
closepath
100 setrgbcolor
fill
newpath
28, 32 moveto
28, 0 lineto
stroke
showpage
```

FIG. 7

```
48 16 moveto
48, 0 lineto
64, 0 lineto
48, 16 lineto
closepath
100 setrgbcolor
fill
newpath
60, 32 moveto
60, 0 lineto
stroke
showpage
```

FIG. 10

```
%!PS
newpath
1 0 0 setrgbcolor
48 144 moveto
48 16 lineto
134 58 lineto
closepath
fill
newpath
0 1 0 setrgbcolor
45 80 6 0 360 arc
fill
75 80 6 0 360 arc
60 160 moveto
60 0 lineto
stroke
100 75 moveto
105 80 110 75 115 88 curveto
stroke
showpage
```

FIG. 11

```
%!PS
newpath
1 0 0 setrgbcolor
16 16 moveto
16 0 lineto
32 0 lineto
closepath
fill
newpath
0 1 0 setrgbcolor
28 32 moveto
28 0 lineto
stroke
showpage
```

FIG. 14

```
%!PS
newpath
1 0 0 setrgbcolor
48 16 moveto
48 0 lineto
64 0 lineto
closepath
fill
newpath
0 1 0 setrgbcolor
60 32 moveto
60 0 lineto
stroke
showpage
```

IMAGE PROCESSING APPARATUS AND METHOD FOR PROCESSING VECTOR IMAGE DATA UNITS OF BLOCKS

BACKGROUND OF THE INVENTION

1. Field of the Invention

The present invention relates to image processing apparatuses and methods for processing vector image data units of blocks.

2. Description of the Related Art

In general, vector image rendering involves two steps: (1) vector image processing for interpreting vector image data such as PostScript or portable document format (PDF) transmitted from a printer driver or the like; and (2) raster image processing including rotation, color conversion, or the like.

When vector image data is input, an image forming apparatus interprets the vector image data and generates and outputs raster image data or compressed image data in a compressed format for each page. The input vector image data represented as a set of objects (graphics objects) of a plurality of types. The objects include, for example, figures, text, etc.

An image output from the image forming apparatus is subjected to image processing such as page composition, rotation, or color conversion as needed, and thereafter, the processed image is transmitted to an image output module so that the image data can be output. Pieces of page image data immediately before output are raster image data and are arranged in the order of scanning by the image output module.

Generally, in order to reduce the time between input of vector image data such as a page description language (PDL) or the like and output of the image data to the image output module, the technique of dividing the image into a plurality of blocks and processing these blocks in parallel is used.

Japanese Patent Laid-Open No. 4-170686 discloses an image processing apparatus for dividing a two-dimensional area to be rendered into a plurality of blocks, assigning the blocks to a plurality of image generators, and forming an image.

However, when the image processing apparatus has the plurality of image generators, the hardware size is increased. The larger the hardware size, the greater the power consumption.

SUMMARY OF THE INVENTION

The present invention reduces the time needed to form an image. Also, the present invention reduces the hardware size, the power consumption, and the image processing time.

According to an aspect of the present invention, there is provided an image processing apparatus configured to process second vector image data associated with a first block of first vector image data. The image processing apparatus includes a processing unit configured to process the second vector image data; a determination unit configured to determine whether the second vector image data satisfies a predetermined condition; a storage unit configured to store a result of processing, by the processing unit, the second vector image data determined by the determination unit to satisfy the predetermined condition; and an output unit configured to output the result of processing the second vector image data by the processing unit, the result being stored in the storage unit, when the second vector image data matches third vector image data associated with a second block of the first vector image data.

According to another aspect of the present invention, there is provided an image processing method for processing second vector image data associated with a first block of first vector image data. The image processing method includes processing the second vector image data; determining whether the second vector image data satisfies a predetermined condition; storing the second vector image data determined to satisfy the predetermined condition; and outputting the result of processing the second vector image data when the second vector image data matches third vector image data associated with a second block of the first vector image data.

Further features of the present invention will become apparent from the following description of exemplary embodiments with reference to the attached drawings.

BRIEF DESCRIPTION OF THE DRAWINGS

FIG. 3 shows exemplary vector image vector image data generated by describing the image shown in FIG. 2 in PDL, according to an aspect of the present invention.

FIG. 4 shows exemplary block vector image data generated by describing a tile of the image divided into tiles in PDL, according to an aspect of the present invention.

FIG. 7 shows exemplary block vector image data generated by describing the strip of the image divided into strips in PDL, according to an aspect of the present invention.

FIG. 10 shows exemplary block vector image data generated by describing the image shown in FIG. 9 in PDL, according to an aspect of the present invention.

FIG. 11 shows exemplary block vector image data generated by describing a tile of the image divided into tiles in PDL, according to an aspect of the present invention.

FIG. 14 shows exemplary block vector image data generated by describing the strip of the image divided into strips in PDL, according to an aspect of the present invention.

DESCRIPTION OF THE EMBODIMENTS

First Exemplary Embodiment

Figure 1:
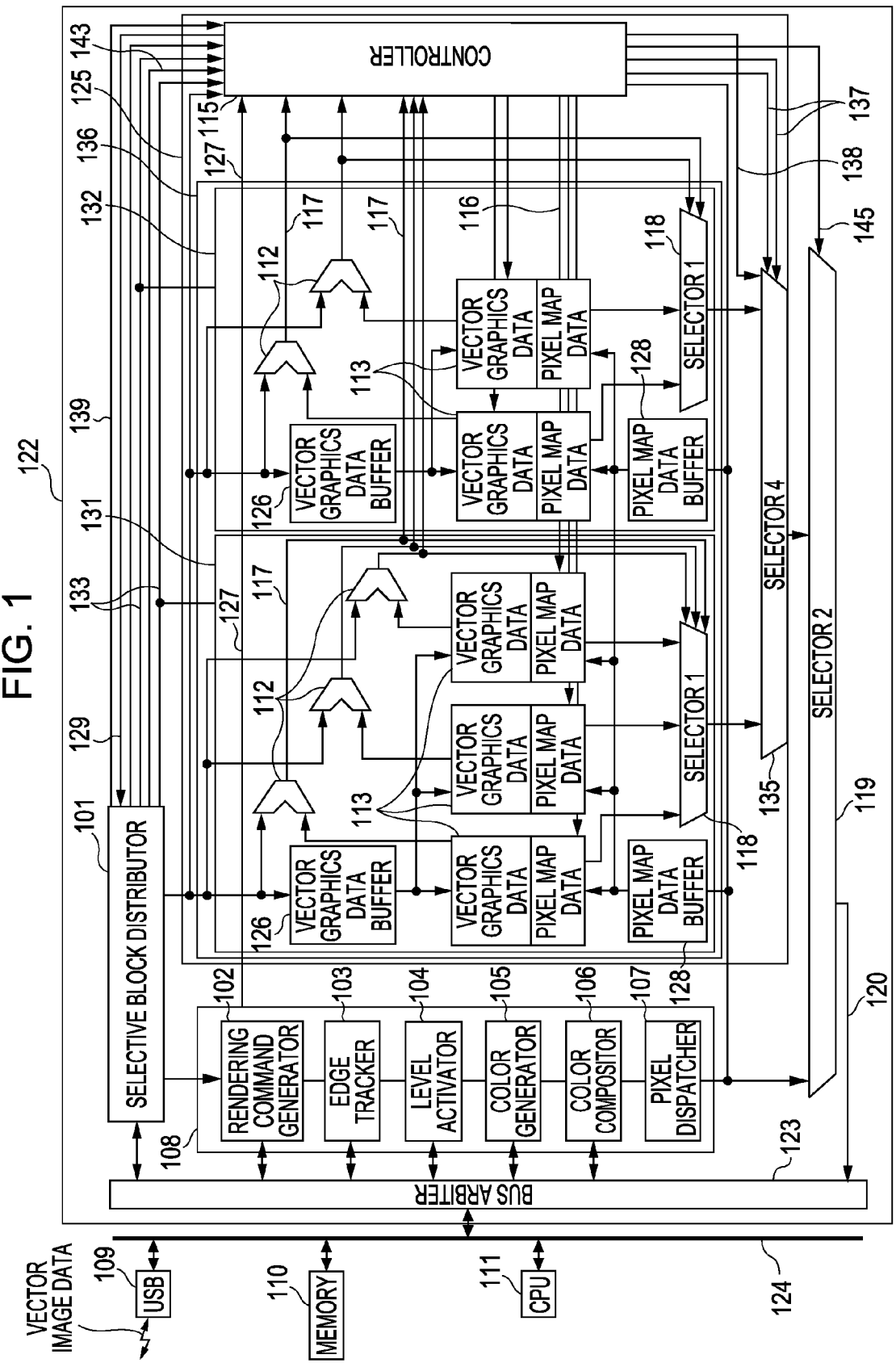
FIG. 1 is a diagram of an exemplary hardware configuration of an image forming apparatus, according to an aspect of the present invention.

A first embodiment of the present invention will be described with reference to the drawings. FIG. 1 shows an exemplary hardware configuration of an image forming apparatus (image processing apparatus) 122.

The image forming apparatus 122 is connected via a bus arbiter 123 to a bus 124. Besides the image forming apparatus 122, a communication interface 109 represented by universal serial bus (USB), a memory 110 for temporarily storing data necessary for image processing, and a central processing unit (CPU) 111 for creating a job for the image forming apparatus 122 and controlling the entire apparatus and for processing vector image data or the like are connected to the bus 124. The communication interface 109 may be a local area network (LAN) interface or a wireless interface.

The image forming apparatus 122 includes a selective block distributor 101, an image forming unit 108, a formed data storage/replacement unit 125, a "selector 2" (119), and the bus arbiter 123.

The selective block distributor 101 sequentially reads block vector image data in units of rectangular blocks (the vector image data is divided into a plurality of rectangular blocks using a method described later), and number-of-objects information included in each of the rectangular blocks.

The selective block distributor 101 copies the read block vector image data and distributes it to the image forming unit 108 and the formed data storage/replacement unit 125. The selective block distributor 101 outputs a level data enable signal 133 corresponding to the number-of-objects information of the read block vector image data to a controller 115. When the number of object is zero, the selective block distributor 101 enables a level-0 level data enable signal 143. When the number of objects is one, a level-1 data storage/replacement unit 131 is enabled. When the number of objects is two, a level-2 data storage/replacement unit 132 is enabled. When activated, the selective block distributor 101 generally reads vector image data for one page and thereafter stops operating.

In the image forming unit 108, the input block vector image data is sequentially processed by a rendering command generator 102, an edge tracker 103, a level activator 104, a color generator 105, a color compositor 106, and a pixel dispatcher 107 to generate pixel map data (which is raster image data or compressed image data). The configuration of the image forming unit 108 will be described in more detail below.

The rendering command generator 102 accesses the bus 124 to read a job and issues a rendering command. According to the rendering command issued by the rendering command generator 102, the edge tracker 103 reads a side record included in the job and extracts side information of a graphics object in units of scanning lines. Thereafter, the edge tracker 103 sorts the side information by scanning line direction (X coordinate direction) in ascending order and thereafter transfers the side information as a message to the level activator 104.

According to the rendering command issued by the rendering command generator 102, the level activator 104 reads a level table included in the job and the side information transferred from the edge tracker 103. Thereafter, the level activator 104 determines the priority of each level and an active pixel range (influencing the rendering) for each scanning line. Thereafter, the level activator 104 sorts information about the active pixel range for each scanning line by priority and generates pixel range information including additional information about its relation with pixels of other levels. The level activator 104 transfers the pixel range information to the color generator 105.

According to the rendering command issued by the rendering command generator 102, the color generator 105 reads a fill table included in the job and the pixel range information transferred from the level activator 104. Thereafter, the color generator 105 determines the color of an active pixel for each level and transfers color information of the active pixel and the pixel range information transferred from the level activator 104 to the color compositor 106.

According to the rendering command issued by the rendering command generator 102, the color compositor 106 performs an operation to determine the color in units of pixels on the basis of the pixel range information for each level, which is generated by the level activator 104, and the color information of the pixel, which is determined by the color generator 105. Thereafter, the color compositor 106 generates a final color of the pixel.

The pixel dispatcher 107 expands, from the final color of the pixel generated by the color compositor 106, pixel information represented in a run-length format in the pixel and transmits the expanded pixel information to the memory 110 and a pixel map data buffer 128.

The selective block distributor 101 and internal modules of the image forming unit 108 are constructed as separate processors or dedicated hardware modules. Alternatively, these elements may be constructed using software. The internal modules are, namely, the rendering command generator 102, the edge tracker 103, the level activator 104, the color generator 105, the color compositor 106, and the pixel dispatcher 107.

The configurations of the formed data storage/replacement unit 125 and the image forming unit 108 are not limited to those of the first embodiment. The formed data storage/replacement unit 125 and the image forming unit 108 may be configured differently as needed for performing similar processing, or a different rendering method may be employed as needed.

The formed data storage/replacement unit 125 includes level data storage/replacement unit 136 and a controller 115. This embodiment explains the case that the level data storage/replacement unit 136 includes level-1 data storage/replacement unit 131 to store block vector image data that has an object, and a level-2 data storage/replacement unit 132 to store block vector image data that has two objects.

Each of the level-1 and level-2 data storage/replacement units 131 and 132 includes temporary storage areas 113. The temporary storage areas 113 each store a combination of the block vector image data and the result of image formation based on the block vector image data (pixel map data). Each of the level data storage/replacement units 131 and 132 in the level data storage/replacement unit 136 further includes comparators 112 for comparing newly input block vector image data with previously stored block vector image data.

Each of the level data storage/replacement units 131 and 132 further includes a selector 1 (118) for selecting data (pixel map data) corresponding to the block vector image data which is stored in the temporary storage areas 113 and is determined by a comparison to match the input block vector image data, thereby outputting the data stored in one of the temporary storage areas 113.

The formed data storage/replacement unit 125 includes a selector 4 (135) for selecting output of effective pixel map data from one of the level data storage/replacement units 131 and 132 and the controller 115 in response to a level-data-storage/replacement-unit output selection signal 137 output from the controller 115.

The controller 115 controls replacement and output of the pixel map data and replacement of the block vector image data on the basis of the comparison result obtained by each comparator 112. Here, the level data storage/replacement units 136 are, namely, the level-1 data storage/replacement unit 131 for storing level-1 image data and the level-2 data storage/replacement unit 132 for storing level-2 image data.

Alternatively, the image forming apparatus 122 can be constructed differently. That is, the formed data storage/replacement unit 125 may include at least one level data storage/replacement unit 136, and the number-of-objects information may be added to each of the temporary storage areas 113 in each level data storage/replacement unit 136. The image forming apparatus 122 may use both the number-of-objects information and the block vector image data to determine the equivalence between the input vector image data and data stored in each of the temporary storage areas 113.

In the first embodiment, the controller 115 performs equivalence determination of the level-0 block vector image data and replacement of the pixel map data. However, an additional level-0 data storage/replacement unit may be provided for tiles having no object. Alternatively, the controller 115 may perform equivalence determination of the level-1 and level-2 block vector image data and replacement of the pixel map data.

In the first embodiment, when the number of objects included in block vector image data supplied from the selective block distributor 101 to the formed data storage/replacement unit 125 is one, the block vector image data is written into one of the temporary storage areas 113 of the level-1 data storage/replacement unit 131. Similarly, when the number of objects is two, one of the temporary storage areas in the level-2 data storage/replacement unit 132 is used. In the first embodiment, there are provided three temporary storage areas 113 for storing a set of block vector image data including one object and pixel map data, and two temporary storage areas 113 for storing a set of block vector image data including two objects and pixel map data. As has been described above, equivalence determination of block vector image data having no object and output of pixel map data are performed in the controller 115.

An exemplary operation of the image forming apparatus (image processing apparatus) 122 will be described step by step, starting from the point at which vector image data in units of pages is input from the communication interface 109.

[(1) Exemplary Input of Vector Image Data]

In general, vector image data is input from a host computer or the like via the communication interface 109 in units of sentences constituted of one page or a plurality of pages. In the first embodiment, an example will be described in which vector image data in one page is stored in the memory 110 via a USB endpoint with direct memory access (DMA).

Upon arrival of the vector image data, the communication interface 109 transfers the arrived vector image data using DMA via the bus 124 to a specified region of the memory 110. Thereafter, the CPU 111 is informed of the data arrival by means of notification such as interruption (not shown). In the first embodiment, the case in which an image shown in FIG. 2, which is divided into tiles, is input will be described by way of example. In the case where an image is divided into lines or strips, an image forming apparatus equivalent to the case of division into tiles, as in the first embodiment, can be constructed by changing processing in units of tiles to processing in units of lines or strips.

[(2) Exemplary Division of vector image data into Blocks]

Figure 2:
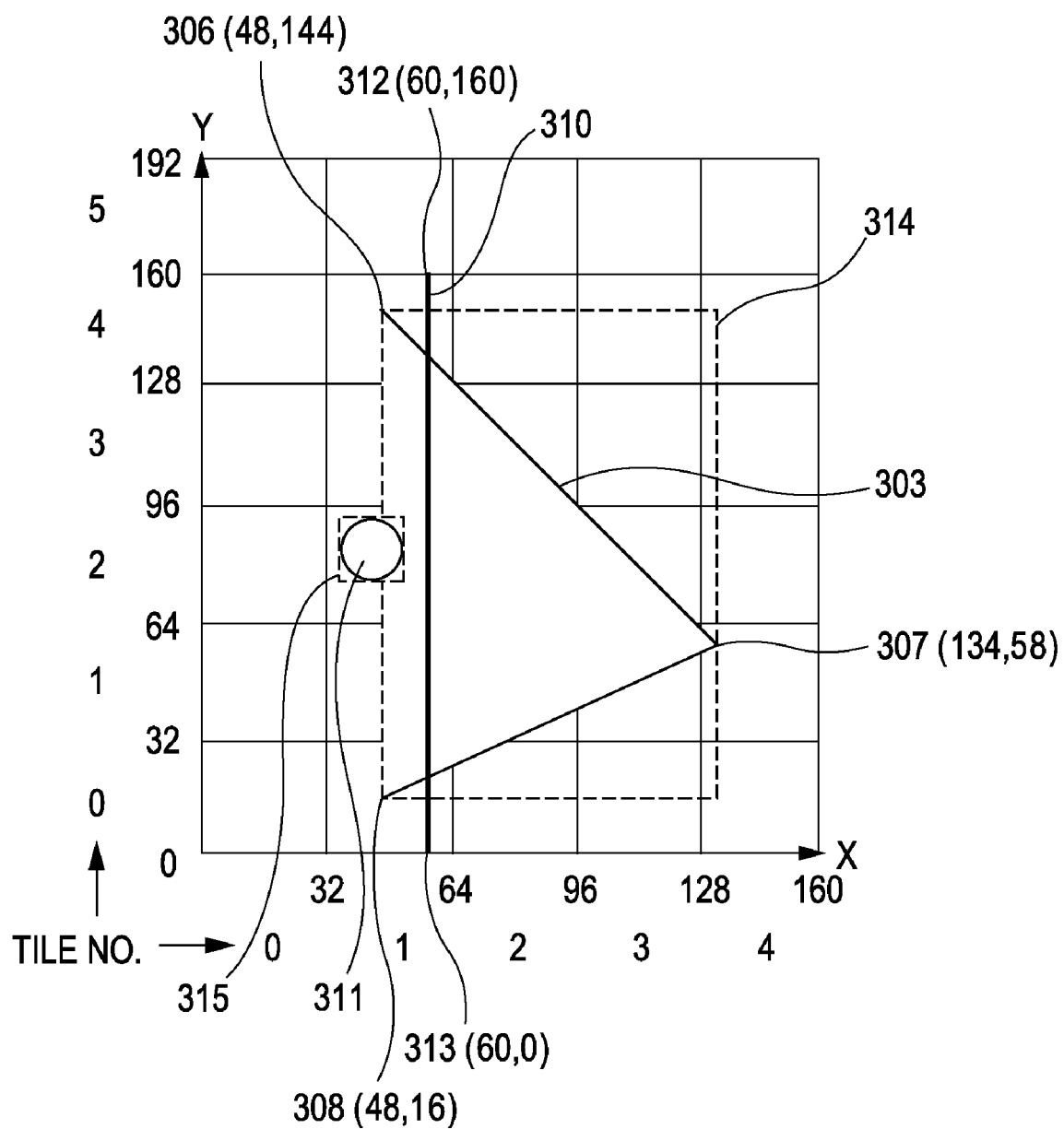
FIG. 2 shows an exemplary image, according to an aspect of the present invention.

The operation of the image forming apparatus 122 shown in FIG. 1 will be schematically described using, for example, the case in which data described in PDL corresponding to the image shown in FIG. 2 is processed. FIG. 2 shows a triangular graphics object 303 and the like. And FIG. 3 shows exemplary block vector image data generated to render the image shown in FIG. 2 in PDL. For example, the image forming apparatus 122 issues a move to command (operator) to move the coordinates of a pen to (X, Y)=(48, 144). From this point, for example, the image forming apparatus 122 sequentially issues line to commands (operators) to render straight lines connecting the coordinates (48, 16), (134, 58), and (48, 144), thereby rendering a triangle.

The image forming apparatus 122 shown in FIG. 1 divides the vector image data, which is input from the communication interface 109 such as USB and which is stored in the memory 110, into a plurality of rectangular blocks so that the image can be rendered quickly and converts the format into block vector image data in each of the rectangular blocks.

Conversion from the PDL of the entire area to be rendered, which is shown in FIG. 3, to the PDL of a tile, which is shown in FIG. 4, can be performed using simple coordinate operations.

The case in which the vector image data described in PDL is divided into tiles by the CPU 111 shown in FIG. 1 will be described by way of example below.

On the basis of the input vector image data described in PDL (the coordinates of the object 303 and a graphics object 310) (FIG. 3), the CPU 111 determines that there is no graphics objects in areas where the x coordinate is less than 48 and the y coordinate is greater than 160 (see FIG. 2).

The case in which the CPU 111 divides the entire page into tiles of 32 by 32 pixels will be examined. There are no objects in tiles with the tile numbers (x, y)=(0, 5), (0, 4), (0, 3), (0, 2), (0, 1), (0, 0), (1, 5), (2, 5), (3, 5), and (4, 5). Each block vector image data simply includes rendering commands for the background.

In the first embodiment, the number of objects included in each tile is counted using extent of a graphics object. The extent corresponds to a rectangular area including the maximum area in which a certain graphics object may exist. For example, an outline 314 is a rectangular area including vertices 306, 308, and 307 being passed through in the course of rendering the graphics object 303.

Alternatively, the number of objects may be counted using a method of counting the number of intersections between each graphics object and the tile border.

The CPU 111 determines that there are two graphics objects in the tile (1, 4) on the basis of the intersections between the sides of the outline 314 and the sides of the tile (1, 4) and the intersections between the graphics object 310 and the sides of the tile (1, 4).

The CPU 111 computes the inclination of each of vectors defined by the vertex 306, the vertex 307, an endpoint 312 at the coordinates (60, 160), and an endpoint 313 at the coordinates (60, 0). Next, the CPU 111 obtains the coordinates of the intersection between the tile border and a straight line rendered from the coordinates of each vertex in the tile and generates new block vector image data in units of tiles.

In general, vertex A (x, y) is converted to vertex A' (x', y') in the following manner:

x'=X coordinate x of vertex A−tile number in X direction× number of pixels in X direction in one tile y'=Y coordinate y of vertex A−tile number in Y direction× number of pixels in Y direction in one tile The converted coordinates (x', y') of the vertex 306 (48, 144) included in the tile (1, 4) are:

X coordinate of the vertex A=48;

Y coordinate of the vertex A=144;

tile number in X direction=1;

tile number in Y direction=4; and number of pixels in X direction in one pixel=number of pixels in Y direction in one pixel=32, thus, x'=48−1×32=16; and y'=144−4×32=16.

The converted coordinates (x", y") of the endpoint 312 (60, 160) in the tile (1, 4) are:

x"=60−1×32=28; and y"=160−4×32=32.

Figure 5:
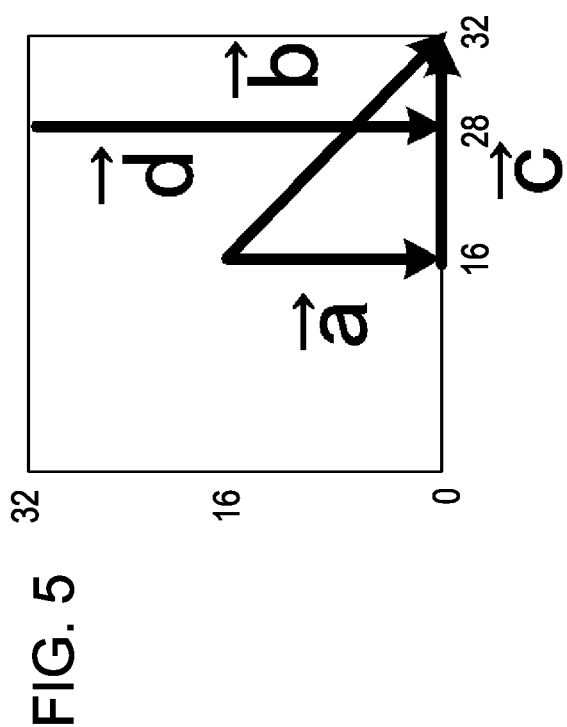
FIG. 5 shows exemplary objects included in the tile of the image divided into tiles, according to an aspect of the present invention.

The inclination of a vector that has the vertex 306 as its endpoint and that points downward in a vertical direction is infinite, and the inclination of a downward-sloping vector that has the vertex 306 as its endpoint is (144−58)/(48−134)=−1. Thus, the object included in the tile with the origin at the lower left is converted into a vector a, a vector b, and a vector c, as shown in FIG. 5. That is, the vector a has the vertex (16, 16) as its start, points downward in the vertical direction, and ends at the tile border. The vector b has the vertex (16, 16) as its start, has an inclination of −1, and ends at the intersection at x=32 or y=0. The vector c includes vectors starting from the intersections of the two vectors a and b with the tile border and ending at (32, 0). Since the endpoint of the vector b is (32, 0) in this example, there is no vector from the vector b to (32, 0).

The endpoint 312 is converted into a vector d that has the endpoint (28, 32) as its start, that points downward in the vertical direction, and that ends at the tile border, as shown in FIG. 5.

As has been described above, a tile of the vector image data divided into tiles is represented as shown in FIG. 4.

Next, an example in which the input PDL is divided into strips will be described. In this case, the operations in the X direction are omitted from the above-described case in which the PDL is divided into tiles.

In this case, the converted coordinates (x', y') of the vertex 306 (48, 144) in strip (4) are:

x'=X coordinate x of vertex=48;

y'=Y coordinate y of vertex−strip number×number of pixels in Y direction in one strip=144−4×32=16.

The converted coordinates (x", y") of the endpoint 312 (60, 160) in the strip (4) are:

x"=X coordinate x of vertex=60; and y"=Y coordinate y of vertex−strip number×number of pixels in Y direction in one strip=160−4×32=32.

Figure 6:
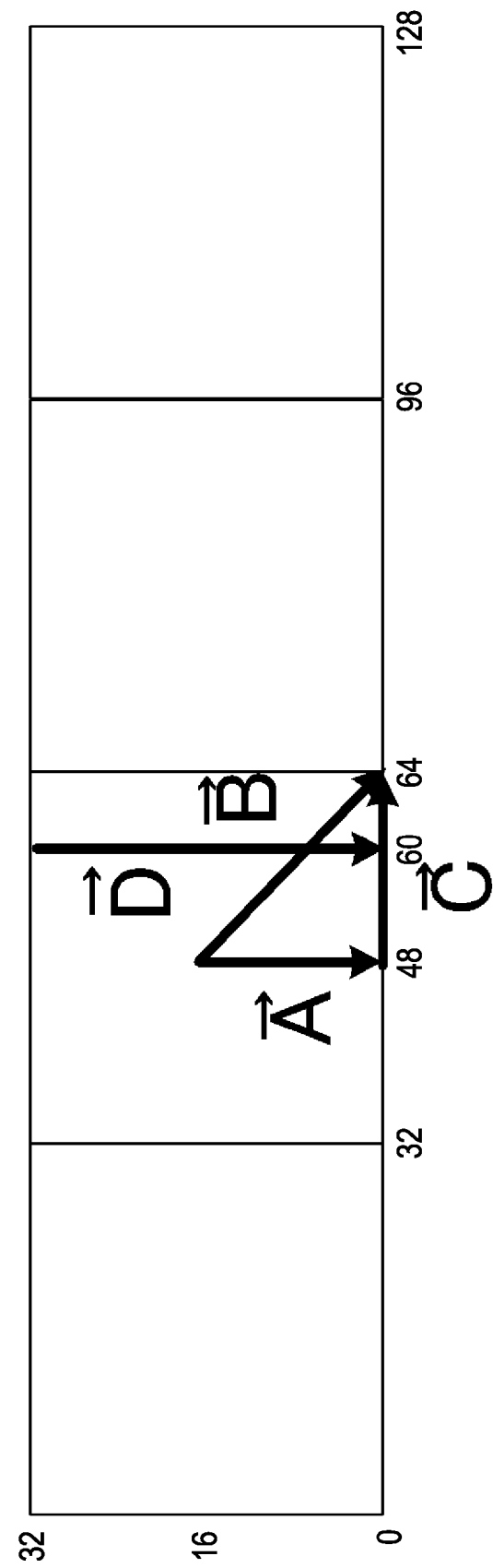
FIG. 6 shows exemplary objects included in a strip of the image divided into strips, according to an aspect of the present invention.

With the processing described above, the objects are converted into a vector A, a vector B, a vector C, and a vector D, as shown in FIG. 6. That is, the vector A has the vertex (48, 16) as its start, points downward in the vertical direction, and ends at the strip border. The vector B has the vertex (48, 16) as its start, has an inclination of −1, and ends at the intersection at y=0. The vector C connects between the intersections of the two vectors A and B with the strip border. The vector D has the endpoint (60, 32) as its start, points downward in the vertical direction, and ends at the strip border. A strip of the converted vector image data divided into strips is represented as shown in FIG. 7.

To divide the PDL data into lines, the intersections of each object with the X coordinate are obtained. Further it is noted that the tiles, strips, or lines into which data is divided using one of the above-described methods will be referred to as "blocks".

Upon completion of division of the vector image data described in PDL into tiles, the CPU 111 sets the storage locations of the block vector image data in the selective block distributor 101 connected to the image forming apparatus 122 and activates the image forming apparatus 122.

[(3) Exemplary Activation of Image Forming Apparatus]

After dividing the vector image data into blocks, the CPU 111 initializes memories in a setting register (not shown) and the temporary storage areas 113 in the image forming apparatus 122. Thereafter, the CPU 111 activates the selective block distributor 101 shown in FIG. 1. Accordingly, the image forming apparatus 122 starts operating.

[(4) Exemplary Image Forming]

The selective block distributor 101 reads block vector image data in units of tiles and distributes it to the formed data storage/replacement unit 125 and the image forming unit 108. The image forming unit 108 processes the block vector image data to generate pixel map data.

At the same time, in the formed data storage/replacement unit 125, the comparators 112 in the level data storage/replacement unit 131 or 132 selected by the level data enable signal 133 perform comparison operations. That is, the comparators 112 each perform an operation to compare the block vector image data input from the selective block distributor 101 with the block vector image data stored in the associated temporary storage area 113.

In the first embodiment, the formed data storage/replacement unit 125 is constructed to record level-1 and level-2 block vector image data. With this configuration, when the number of objects included in a read tile is one or two corresponding to the formed data storage/replacement unit 125, the selective block distributor 101 informs the controller 115 of the number of objects using the level data enable signal 133. In the case of input of data including objects, the number of which is other than one or two, the selective block distributor 101 de-asserts the level data enable signal 133. When a read tile includes no object, the selective block distributor 101 asserts the level-0 level data enable signal 143 and informs the controller 115 of the number of objects.

In the first embodiment, each of the comparators 112 is a 128-bit comparator that continuously and sequentially compares, from the first block, the block vector image data supplied from the selective block distributor 101 with vector image data stored in the associated temporary storage area 113. When the two pieces of block vector image data match each other, the comparator 112 asserts a matching signal 117 and informs the controller 115 of the match. When the two pieces of block vector image data do not match each other, the comparator 112 de-asserts the matching signal 117 and stops outputting the matching signal 117 until a new piece of block vector image data is supplied from the selective block distributor 101.

As a result of the aforementioned processing, when the matching signal 117 is asserted after the reading of the block vector image data, the controller 115 determines that the block vector image data input from the selective block distributor 101 matches the block vector image data stored in one of the temporary storage areas 113.

In general, after input of the block vector image data, the rendering command generator 102 needs time to perform analysis and generation operations. The subsequent rendering operation also requires time depending on the complexity of the image. Thus, the comparison result is obtained by each comparator 112 prior to the completion of a rendering operation (image forming operation) performed by the image forming unit 108.

The image forming apparatus (image processing apparatus) 122 processes block vector image data in units of blocks. When block vector image data associated with a first block satisfies a predetermined condition, the image forming apparatus 122 stores the result of processing the block vector image data associated with the first block in one temporary storage area 113. When the block vector image data associated with the first block matches block vector image data associated with a second block, the image forming apparatus 122 outputs the result of processing the block vector image data associated with the first block, which has been stored in the temporary storage area 113. In the first embodiment, the predetermined condition indicates that the number of objects included in one block is zero, one, or two. The comparator 112 compares the block vector image data associated with the first block with the block vector image data associated with the second block to determine whether the two pieces of block vector image data match each other.

Figure 8:
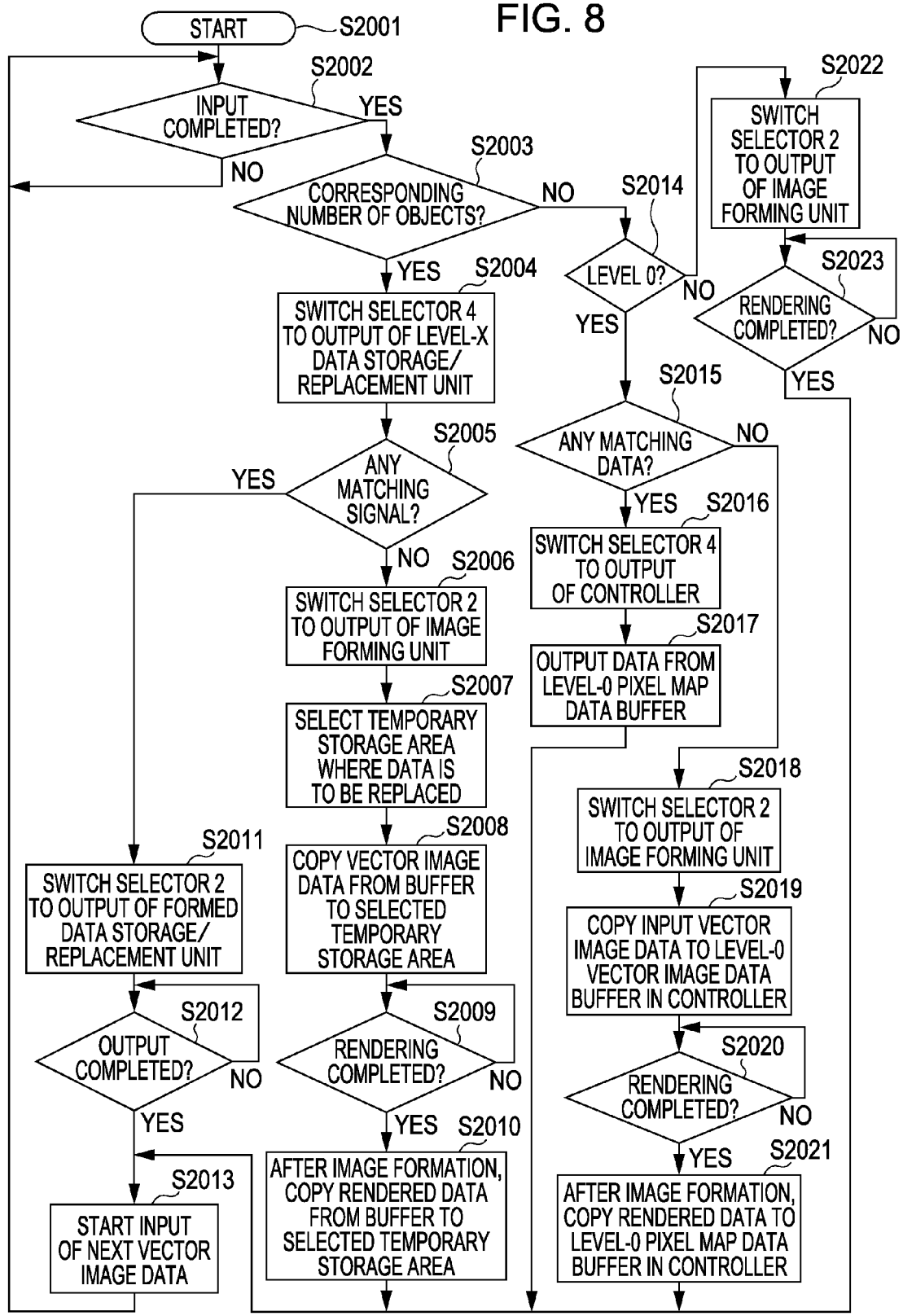
FIG. 8 is a flowchart of exemplary operation of a controller, according to an aspect of the present invention.

FIG. 8 shows an example process performed by the controller 115. When the process starts (S2001), in step S2002, the controller 115 waits for completion of the reading of one tile of the block vector image data by the selective block distributor 101. At the same time as being read, the block vector image data is temporarily stored in a vector image data buffer 126.

Upon completion of the reading of the block vector image data, the controller 115 determines in step S2003 whether the formed data storage/replacement unit 125 includes the level data storage/replacement unit 136 corresponding to the number of objects included in the input block vector image data. The controller 115 performs the determination on the basis of input of the level data enable signal 133 and level-0 data enable signal 143 corresponding to the controller 115 or the level-1 data storage/replacement unit 131 or the level-2 data storage/replacement unit 132, which is input from the selective block distributor 101.

When the number of objects included in one tile of the block vector image data is the number of objects supported by the formed data storage/replacement unit 125 (i.e., one or two), the controller 115 switches the selector 4 (135) in step S2004. That is, the controller 115 outputs the level-data-storage/replacement-unit output selection signal 137 indicating that output of the level data storage/replacement unit 136 (i.e., 131 or 132) corresponding to the input block vector image data serves as output of the formed data storage/replacement unit 125. In step S2005, the controller 115 determines whether there is the matching signal 117 indicating that the input block vector image data matches any block vector image data in the temporary storage areas 113 of the level data storage/replacement unit 136 corresponding to the input block vector image data. If the image forming apparatus 122 operates normally, all the matching signals 117 are de-asserted or one of the matching signals 117 is asserted.

When a plurality of the matching signals 117 are asserted, the controller 115 may perform an abnormal end operation. When the matching signal 117, in step S2011, the controller 115 switches the selector 2 (119) so that the pixel map data output from the formed data storage/replacement unit 125 serves as the processing result obtained by the image forming apparatus 122. That is, the controller 115 outputs the pixel map data stored in the temporary storage area 113 corresponding to the block vector image data matching the input block vector image data as the processing result to the bus arbiter 123 via an output bus 120. In the first embodiment, one of the pieces of rendered data in the plural temporary storage areas 113 has already been selected by the matching signal 117 indicating the comparison result, which is directly connected to the selector 1 (118).

Alternatively, the selection may be performed by the controller 115. Further, it is noted that the bus arbiter 123 having received the pixel map data writes the pixel map data in a predetermined region of the memory 110. In step S2012, the bus arbiter 123 waits for completion of output of the rendered data. Upon completion, the flow proceeds to step S2013, and the controller 115 uses a block vector image data reading instruction signal 129 to instruct the selective block distributor 101 to read the next piece of the block vector image data. Thereafter, the controller 115 returns to step S2002 and waits for completion of input of the next piece of the block vector image data.

In contrast, when the determination in step S2003 shows that the input block vector image data includes objects, the number of which is not supported by the level data storage/replacement units 136, the flow proceeds to step S2014. In step S2014, the controller 115 determines whether the input block vector image data corresponds to a level-0 tile supported by the controller 115.

When the input block vector image data corresponds to a level-0 tile including no object, the flow proceeds to step S2015. In step S2015, the controller 115 determines whether the input block vector image data matches data stored in a level-0 block vector image data buffer (not shown) in the controller 115.

When the comparison result shows that there is data that matches the input block vector image data, the controller 115 switches the selector 4(135) by setting the level-data-storage/replacement-unit output selection signal 137 indicating that output of controller 115 in step S2016. In step S2017, the controller 115 outputs the contents of a level-0 pixel map data buffer (not shown) in the controller 115 via a level-0 pixel map data output bus 138.

When the determination in step S2015 shows that there is no matching effective data, in step S2018, the controller 115 switches the selector 2 (119) by asserting pixel map output switch signal 145 so that output of the image forming unit 108 serves as output of the image forming apparatus 122. In step S2019, the controller 115 copies the input block vector image data into the level-0 vector image data buffer (not shown) included in the controller 115. In step S2020, the controller 115 confirms completion of rendering (image formation) performed by the image forming unit 108, and thereafter, in step S2021, the controller 115 copies the pixel map data output from the image forming unit 108 into the level-0 pixel map data buffer included in the controller 115.

In contrast, when the determination in step S2014 shows that the input block vector image data includes objects, the number of which is other than level zero, in step S2022, the controller 115 switches the selector 2 (119) to output of the image forming unit 108. When the determination in step S2005 shows that there is no matching signal 117, in step S2006, the controller 115 switches the selector 2 (119) to output of the image forming unit 108.

In step S2007, the controller 115 selects one temporary storage area 113 where data is to be replaced from among the plural temporary storage areas 113 of the level data storage/replacement unit 136 (i.e., 131 or 132) corresponding to the input block vector image data. In the first embodiment, the controller 115 uses a round-robin method to select the adjacent temporary storage area 113 as the next temporary storage area where data is to be replaced every time the rewiring occurs.

In step S2008, the controller 115 stores the block vector image data in the temporary storage area 113 selected in step S2007. This is performed by copying the block vector image data temporarily stored in the vector image data buffer 126. In step S2009, the controller 115 waits for completion of image formation performed by the image forming unit 108 by monitoring an image-formation-unit operation completion signal 127. Upon completion of image formation, the flow proceeds to step S2010, and the controller 115 copies the pixel map data stored in the pixel map data buffer 128 to the selected temporary storage area 113, as in the block vector image data.

After the data is copied, the flow proceeds to step S2013, and the controller 115 uses the block vector image data reading instruction signal 129 to instruct the selective block distributor 101 to read the next piece of the block vector image data. Thereafter, the controller 115 returns to step S2002 and waits for completion of input of the next piece of the block vector image data.

When the image shown in FIG. 2 is input as the vector image data shown in FIG. 3, the CPU 111 divides the image into 30 tiles with the tile numbers from (0, 0) to (4, 5).

The CPU 111 generates 30 pieces of block vector image data for the associated tiles, stores the generated pieces of block vector image data in the memory 110, and saves the storage locations of the pieces of block vector image data for the associated tiles in the selective block distributor 101.

Next, the selective block distributor 101 sequentially reads the pieces of block vector image data into the image forming apparatus 122 to form an image in the following order: the tile numbers (0, 0), (0, 1), (0, 2), (0, 3), (0, 4), (0, 5), (1, 0), (1, 1), (1, 2), . . .

Since the tile (0, 0) is the first tile, the image forming unit 108 performs a rendering operation to generate pixel map data for a blank area. The controller 115 performs steps S2002, S2003, S2014, S2015, S2018 to S2021, and S2013 in FIG. 8 in this order, thereby updating the level-0 vector image data buffer (not shown) and the level-0 pixel map data buffer (not shown) in the controller 115.

Since the second tile (0, 1) includes no object, the block vector image data for the tile (0,1) matches the block vector image data for the tile (0, 0). Thus, the controller 115 performs steps S2002, S2003, S2014, S2015, S2016, S2017, and S2013 in FIG. 8 in this order, thereby outputting the pixel map data already rendered for the tile (0, 0) as pixel map data for the tile (0, 1) from the image forming apparatus 122. For the tiles (0, 2), (0, 3), (0, 4), and (0, 5), a time-consuming rendering operation is similarly omitted.

The next tile to be processed is the tile (1, 0) at the bottom. Since the number of objects included in the tile (1, 0) is two, the level-2 data storage/replacement unit 132 is enabled by the controller 115. However, since the block vector image data does not match data stored in the temporary storage areas 113 in the level-2 data storage/replacement unit 132, the image forming unit 108 performs a rendering operation to generate pixel map data. The input block vector image data and the generated pixel map data are stored in the first temporary storage area 113 in the level-2 data storage/replacement unit 132.

Since the number of objects included in the next tile (1, 1) is two, the level-2 data storage/replacement unit 132 is enabled by the controller 115. However, since the block vector image data for the tile (1, 1) does not match the block vector image data stored in the temporary storage areas 113, the image forming unit 108 performs a rendering operation to generate pixel map data. The input block vector image data and the generated pixel map data are stored in the second temporary storage area 113 in the level-2 data storage/replacement unit 132.

Since the number of objects included in the next tile (1, 2) is three, there is no corresponding level data storage/replacement unit 136. The controller 115 performs steps S2002, S2003, S2014, S2022, S2023 and S2013 in this order and outputs the rendering operation result obtained by the image forming unit 108. When the number of objects is three, the controller 115 saves neither the input block vector image data nor the pixel map data.

Since the input block vector image data for the tile (1, 3) matches the block vector image data for the tile (1, 1) stored in the second temporary storage area 113, the rendered pixel map data is output from the second temporary storage area 113 without waiting for completion of a rendering operation.

Since the input block vector image data for the next tile (1, 4) matches none of the pieces of data stored in the temporary storage areas 113, the image forming unit 108 performs a rendering operation to generate pixel map data.

In the case of the tile (1, 4), since both of the temporary storage areas 113 included in the level-2 data storage/replacement unit 132 for storing the block vector image data and the pixel map data have already been used, the block vector image data and the pixel map data in the first temporary storage area 113 are overwritten.

The image forming apparatus 122 repeats the above operation until completion of output of data rendered for the tile (4, 5).

As has been described above, according to the image forming apparatus 122 of the first embodiment, a comparison is made between rendering-completed block vector image data and block vector image data to be rendered in the course of forming an image from block vector image data represented by PDL or the like. When the comparison result shows that the two pieces of data match each other, the image forming apparatus 122 outputs the already-rendered data (pixel map data) stored therein, instead of performing a time-consuming analysis and rendering operation of the block vector image data. That is, it becomes unnecessary to form an image from the already-rendered block vector image data, thereby realizing high-speed image formation.

Particularly in the case of image formation involving division of one page into a plurality of tiles, the amount of data rendered by the image forming unit 108 can be reduced. Thus, the time needed for image formation of one page can be reduced.

An image formation operation is generally performed by a hardware processor operating at high speed. Thus, the power consumption can be reduced by not performing unnecessary image formation.

According to the image forming apparatus 122 of the first embodiment, block vector image data that is highly likely to be reused can be selectively stored in the temporary storage areas 113. That is, tile information including objects, which is highly likely to be reused, is stored in the temporary storage areas 113 in the level data storage/replacement unit 136. Therefore, the number of times the same block vector image data is rendered can be reduced, thereby increasing the rendering efficiency.

Due to the improvement of the effective usage rate of the temporary storage areas 113, each of the level data storage/replacement units 136 can be constructed using fewer temporary storage areas 113 and comparators 112. Accordingly, reduction in the implemented hardware size and in the power consumption can be expected.

By omitting the equivalence determination for a tile that is less likely to be reused, the determination time can be reduced due to a reduction in determination conditions needed for the equivalence determination. Because operations needed for the equivalence determination are reduced in number, a circuit used to perform the equivalence determination can be stopped after the equivalence determination, thereby reducing the power consumption. In this case, the equivalence determination corresponds to, for example, steps S2005 and S2015.

Second Exemplary Embodiment

A second embodiment of the present invention will now be described. The hardware configuration of the image forming apparatus 122 of the second embodiment is common to that shown in FIG. 1. In the following description of the second embodiment, descriptions of portions common to the first embodiment are omitted to avoid redundancy.

In the second embodiment, it is determined whether objects included in input block vector image data satisfy a shape determination condition. The object shape determination condition in the second embodiment indicates whether all the objects included in the block vector image data are constituted only of line to operators.

In the second embodiment, the selective block distributor 101 sequentially reads pieces of block vector image data, each piece having number-of-objects information indicating the number of objects included in an associated block and the shape determination result added by the CPU 111.

The selective block distributor 101 refers to the shape determination result added to the block vector image data and determines whether to record the block vector image in the formed data storage/replacement unit 125. To record the block vector image in the formed data storage/replacement unit 125, the selective block distributor 101 copies the read block vector image data and distributes it to the image forming unit 108 and the formed data storage/replacement unit 125. The selective block distributor 101 outputs the level data enable signal 133 corresponding to the number-of-objects information included in the block vector image data and a block-vector-image recording enable signal 139 indicating the shape determination result of the block vector image to the controller 115.

In the second embodiment, when the number of objects included in the block vector image data is one in the state in which the block-vector-image recording enable signal 139 is asserted, the block vector image data is written into one of the temporary storage areas 131 in the level-1 data storage/replacement unit 131. The block-vector-image recording enable signal 139 is supplied from the selective block distributor 101 to the controller 115. The block vector image data is supplied from the selective block distributor 101 to the formed data storage/replacement unit 125.

Similarly, when the number of objects included in the block vector image data is two in the state in which the block-vector-image recording enable signal 139 is asserted, the block vector image data is written into one of the temporary storage areas in the level-2 data storage/replacement unit 132.

As has been described above, the equivalence determination of the block vector image data having no object and output of the pixel map data are performed in the controller 115. In this case, only the block vector image data input from the selective block distributor 101 to the controller 115 in the state where the block-vector-image recording enable signal 139 is asserted is stored.

In the second embodiment, the image forming apparatus 122 records only a block including an object that has five operands or fewer and that is constituted only of line to operators or a blank block in the formed data storage/replacement unit 125. Alternatively, the image forming apparatus 122 may select an object on the basis of operands or operators.

Figure 9:
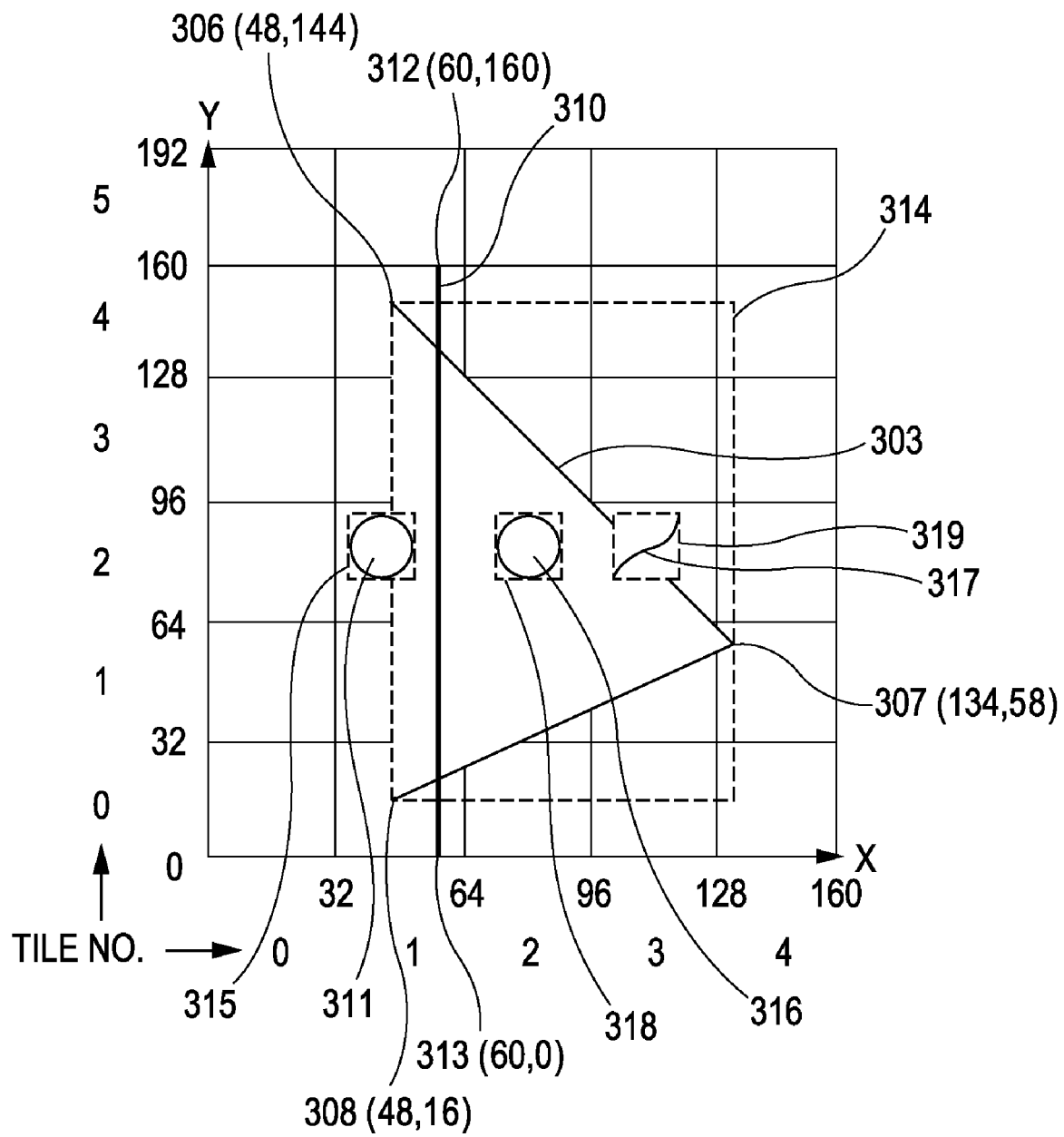
FIG. 9 shows another exemplary image, according to an aspect of the present invention.

The operation of the image forming apparatus 122 shown in FIG. 1 will be schematically described using, for example, the case in which data described in PDL corresponding to an image shown in FIG. 9 is processed.

FIG. 9 shows the triangular graphics object 303, the straight-line graphics object 310, circular graphics objects 311 and 316, and a curve object 317. FIG. 10 shows exemplary block vector image data generated by describing the image shown in FIG. 9 in PDL.

For example, the image forming apparatus 122 initially issues a move to command (operator) to move the coordinates of a pen to (X, Y)=(48, 144). From this point, for example, the image forming apparatus 122 sequentially issues line to commands (operators) to render straight lines connecting the coordinates (48, 16), (134, 58), and (48, 144), thereby rendering a red triangle.

Next, the image forming apparatus 122 sequentially renders the circular objects 311 and 316 having a radius of six around (X, Y)=(45, 80) and (X, Y)=(75, 80), respectively. The image forming apparatus 122 issues a move to command (operator) to move the pen coordinates to (X, Y)=(60, 160) and issues a line to command (operator) to render a straight line from (60, 160) to (60, 0). At last, the image forming apparatus 122 moves the pen coordinates to (X, Y)=(100, 75) and renders the curve object 317 having the current pen coordinates (105, 80), (110, 75), and (115, 88) as its control points.

The image forming apparatus 122 shown in FIG. 1 divides the vector image data, which is input from the communication interface 109 such as USB and which is stored in the memory 110, into a plurality of rectangular blocks so that the image can be rendered quickly and converts the format into block vector image data in each of the rectangular blocks.

Conversion from the PDL of the entire area to be rendered, which is shown in FIG. 10, to the PDL of a tile, which is shown in FIG. 11, can be performed using simple coordinate operations. The case in which the block vector image data described in PDL is divided into tiles by the CPU 111 shown in FIG. 1 will be described by way of example below.

On the basis of the input vector image data described in PDL (FIG. 10), the CPU 111 determines that there is no graphics object in areas where the x coordinate is less than 39 and the y coordinate is greater than 160 (see FIG. 9). The determination is performed using, of the vector image data, the vertex 306 of the graphics object 303, the vertex 308 of the graphics object 303, the range of a rectangle (outline) 315 circumscribed by the graphics object 311, and the endpoint 312 of the graphics object 310.

The case in which the CPU 111 divides the entire page into tiles of 32 by 32 pixels will be examined. There are no objects in tiles with the tile numbers (x, y)=(0, 5), (0, 4), (0, 3), (0, 2), (0, 1), (0, 0), (1, 5), (2, 5), (3, 5), and (4, 5).

Figure 12:
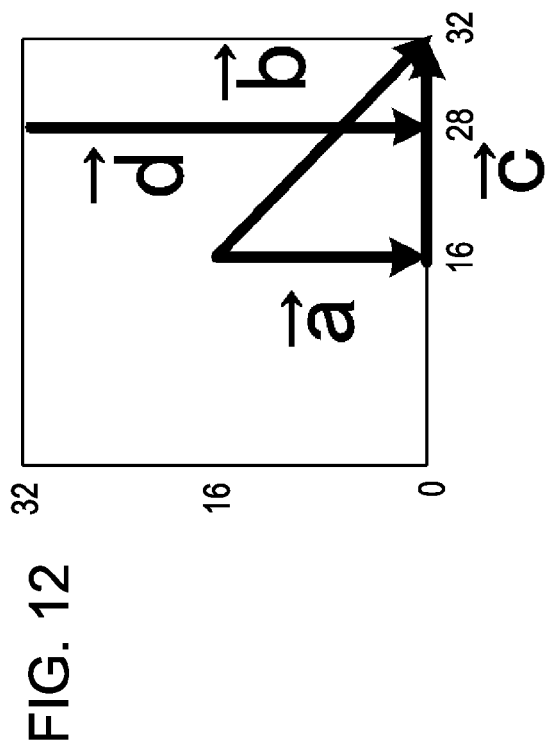
FIG. 12 shows exemplary objects included in the tile of the image divided into tiles, according to an aspect of the present invention.

In the second embodiment, when the block vector image data described in PDL is divided into tiles by the CPU 111 shown in FIG. 1, the endpoint 312 is converted into a vector d that has the endpoint (28, 32) as its start, that points downward in the vertical direction, and that ends at the tile border, as shown in FIG. 12. As has been described above, a tile of the converted vector image data divided into tiles is represented as shown in FIG. 11.

Figure 13:
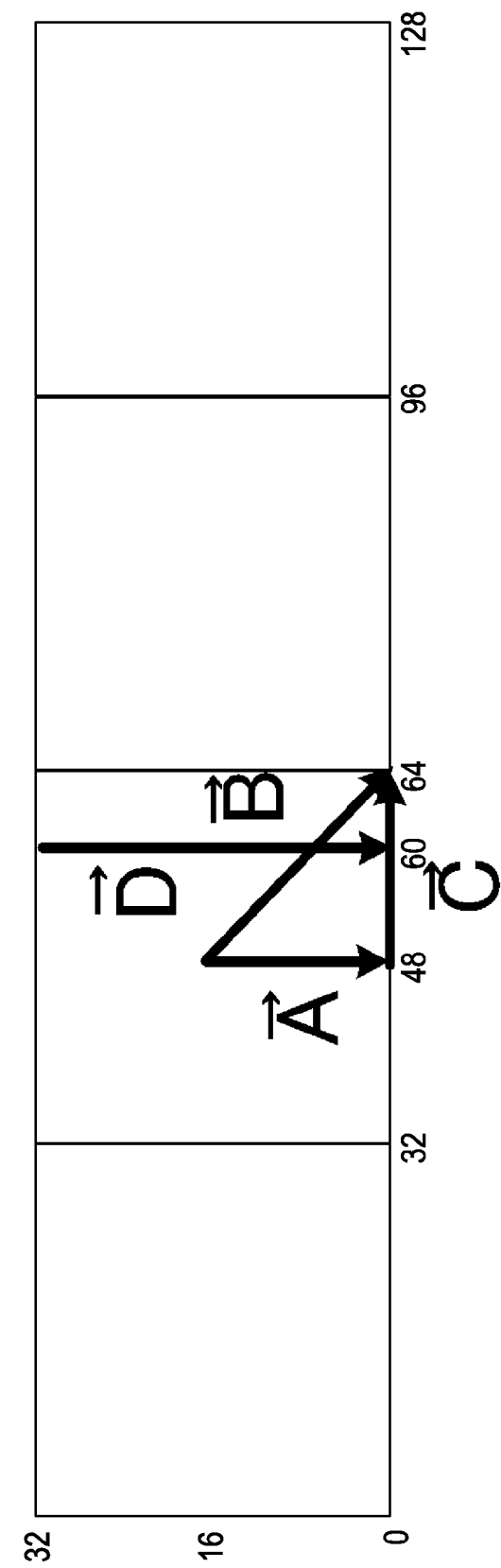
FIG. 13 shows exemplary objects included in a strip of the image divided into strips, according to an aspect of the present invention.

When the input PDL is divided into strips, the objects are converted into a vector A, a vector B, a vector C, and a vector D, as shown in FIG. 13. A strip of the converted vector image data divided into strips is represented as shown in FIG. 14.

In the second embodiment, the formed data storage/replacement unit 125 is constructed to record level-1 and level-2 block vector image data.

With this configuration, when the number of objects included in a read tile is one or two corresponding to the formed data storage/replacement unit 125, the selective block distributor 101 asserts the level data enable signal 133. Also, the selective block distributor 101 informs the controller 115 and the level data storage/replacement units 136 of the number of objects. When the number of objects is one, the level-1 data storage/replacement unit 131 is enabled. When the number of objects is two, the level-2 data storage/replacement unit 132 is enabled. In the case of input of data including objects, the number of which is other than one or two, the selective block distributor 101 de-asserts the level data enable signal 133. When a read tile includes no object, the selective block distributor 101 asserts the level-0 data enable signal 143 and informs the controller 115 of the number of objects.

Figure 15:
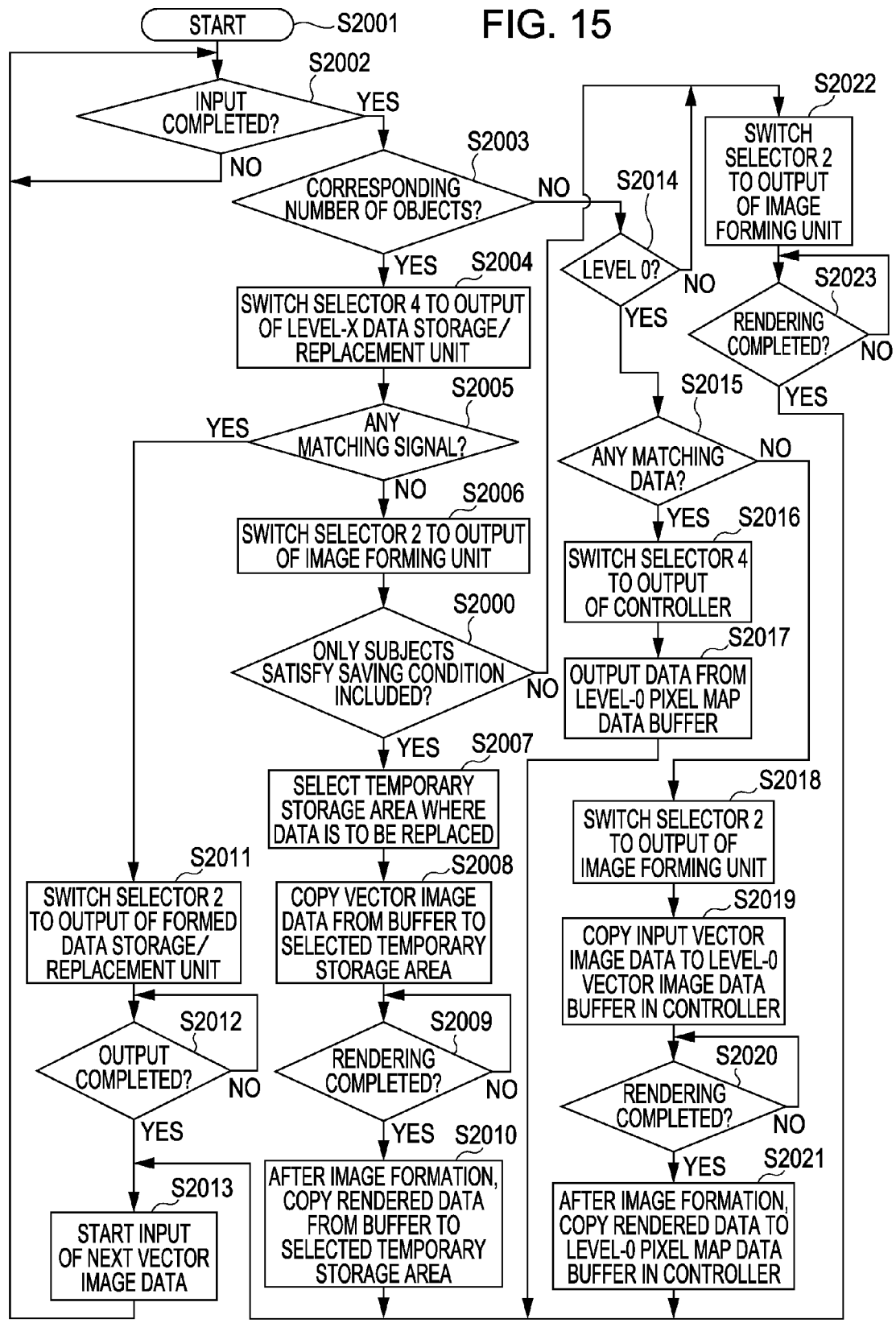
FIG. 15 is a flowchart of another exemplary operation of the controller, according to an aspect of the present invention.

FIG. 15 shows an example process performed by the controller 115 in the second embodiment. In the second embodiment, step S2000 is additionally performed between steps S2006 and S2007 in the first embodiment.

When the determination in step S2014 in FIG. 8 shows input of block vector image data including objects, the number of which is other than level zero, in step S2022, the controller 115 switches the selector 2 (119) to output of the image forming unit 108. When there is no matching signal 117 in step S2005 in FIG. 8, in step S2006, the controller 115 switches the selector 2 (119) to output of the image forming unit 108.

In step S2000, the controller 115 determines whether the input data includes only objects which satisfy a saving condition. When the controller 115 determines that the input data includes only subjects which satisfy the saving condition, the flow proceeds to step S2007. In contrast, when the controller 115 determines that the input data includes a subject which dissatisfies the saving condition, the flow proceeds to stepS2022.

When the image shown in FIG. 9 is input as the vector image data shown in FIG. 10, the CPU 111 divides the image into 30 tiles with the tile numbers from (0, 0) to (4, 5). For example, when checking the outline of each object in tile division, the CPU 111 determines whether an operator specifying the path of the object is a line to operator and adds a flag indicating the operator determination result to the block vector image data.

The CPU 111 generates, for the associated tiles, 30 pieces of block vector image data including the additional operator determination results, stores the generated pieces of block vector image data including the additional operator determination results in the memory 110, and saves the storage locations of the pieces of block vector image data for the associated tiles in the selective block distributor 101.

Next, the selective block distributor 101 sequentially reads the pieces of block vector image data into the image forming apparatus 122 to form an image in the following order: the tile numbers (0, 0), (1, 0), (2, 0), (3, 0), (4, 0), (0, 1), (1, 1), (2, 1), (3, 1) . . .

Since the tile (0, 0) is the first tile, the image forming unit 108 performs a rendering operation to generate pixel map data for a blank area. The controller 115 performs steps S2002, S2003, S2014, S2015, S2018 to S2021, and S2013 in FIG. 8 in this order, thereby updating the level-0 vector image data buffer and the level-0 pixel map data buffer in the controller 115.

The next tile (1, 0) includes the object 310 constituted only of line to operators and the outline 314 of the object 303. Since the tile (1, 0) satisfies the object shape determination condition in the second embodiment, the selective block distributor 101 asserts the block-vector-image recording enable signal 139. Since the number of objects included in the tile (1, 0) is two, the selective block distributor 101 asserts the level data enable signal 133.

As has been described above, the two signals are asserted, and the selective block distributor 101 selects the level-2 data storage/replacement unit 132 of the level data storage/replacement units 136. However, the input block vector image data does not match any block vector image data stored in the temporary storage areas 113 in the level-2 data storage/replacement unit 132. Thus, the controller 115 performs steps S2002, S2003, S2004, S2005, S2006, S2000, S2007, S2008, S2009, and S2010 in this order. For the tile (1, 0), the image forming unit 108 performs a rendering operation to generate pixel map data. The block vector image data and the pixel map data are stored in the first temporary storage area 113 in the level-2 data storage/replacement unit 132.

The tile (2, 0) includes the outline 314 of the object 303 constituted only of line to operators. Since the tile (2, 0) satisfies the object shape determination condition in the second embodiment, the selective block distributor 101 asserts the block-vector-image recording enable signal 139. Since the number of objects included in the tile (2, 0) is one, the selective block distributor 101 asserts the level data enable signal 133.

As has been described above, the two signals are asserted, and the selective block distributor 101 selects the level-1 data storage/replacement unit 131 of the level data storage/replacement units 136. However, the input block vector image data does not match any block vector image data stored in the temporary storage areas 113 in the level-1 data storage/replacement unit 131. Thus, the controller 115 performs steps S2002, S2003, S2004, S2005, S2006, S2000, S2007, S2008, S2009, and S2010 in this order. For the tile (2, 0), the image forming unit 108 performs a rendering operation to generate pixel map data. The block vector image data and the pixel map data are stored in the first temporary storage area 113 in the level-1 data storage/replacement unit 131.

The tile (3, 0) includes the outline 314 of the object 303. Since the tile (3, 0) satisfies the object shape determination condition in the second embodiment, the selective block distributor 101 asserts the block-vector-image recording enable signal 139. Since the number of objects included in the tile (3, 0) is one, the selective block distributor 101 asserts the level data enable signal 133.

As has been described above, the two signals are asserted, and the selective block distributor 101 selects the level-1 data storage/replacement unit 131 of the level data storage/replacement units 136. However, the input vector image data does not match any block vector image data stored in the temporary storage areas 113 in the level-1 data storage/replacement unit 131. Thus, the controller 115 performs steps S2002, S2003, S2004, S2005, S2006, S2000, S2007, S2008, S2009, and S2010 in this order. For the tile (3, 0), the image forming unit 108 performs a rendering operation to generate pixel map data. The block vector image data and the pixel map data are stored in the second temporary storage area 113 in the level-1 data storage/replacement unit 131.

The tile (4, 0) includes the outline 314 of the object 303. Since the tile (4, 0) satisfies the object shape determination condition in the second embodiment, the selective block distributor 101 asserts the block-vector-image recording enable signal 139. Since the number of objects included in the tile (4, 0) is one, the selective block distributor 101 asserts the level data enable signal 133.

As has been described above, the two signals are asserted, and the selective block distributor 101 selects the level-1 data storage/replacement unit 131 of the level data storage/replacement units 136. In this case, the input block vector image data for the tile (4, 0) matches the block vector image data for the tile (3, 0) stored in the second temporary storage area 113. Thus, the controller 115 performs steps S2002, S2003, S2004, S2005, S2011, S2012, and S2013 in this order. The pixel map data already rendered for the tile (3, 0) is output as data for the tile (4, 0).

Since the tile (0, 1) includes no outline of an object, the block vector image data for the tile (0, 1) matches the block vector image data for the tile (0, 0). Thus, the controller 115 performs steps S2002, S2003, S2014, S2015, S2016, and S2017 in this order. The pixel map data already rendered for the tile (0, 0) is output as data for the tile (0, 1).

The tile (1, 1) includes two objects and satisfies the object shape determination condition in the second embodiment. Thus, the tile (1, 1) is processed similarly to the tile (1, 0). The block vector image data and the pixel map data are stored in the second temporary storage area 113 in the level-2 data storage/replacement unit 132.

Thereafter, new pieces of block vector image data are respectively input for the tiles (2, 1), (3, 1), and (4, 1). Thus, these tiles (2, 1), (3, 1), and (4, 1) are processed similarly to the tile (2, 0). Pieces of block vector image data and pieces of pixel map data are stored in the third, first, and second temporary storage areas 113 of the level-1 data storage/replacement unit 131, respectively. The tile (0, 2) is processed similarly to the tile (0, 1).

The tile (1, 2) includes the object 310 constituted only of line to operators and the outline 315 of the circular object 311. Since the tile (1, 2) includes the outline 315 of the circular object 311, the tile (1, 2) does not satisfy the object shape determination condition in the second embodiment. Thus, the selective block distributor 101 de-asserts the block-vector-image recording enable signal 139. Since the number of objects included in the tile (1, 2) is three, the selective block distributor 101 de-asserts both the level data enable signal 133 and level-0 data enable signal 143.

Thus, the controller 115 performs steps S2002, S2003, S2014, S2022, S2023 in this order. For the tile (1, 2), the image forming unit 108 performs a rendering operation to generate pixel map data. However, since the tile (1, 2) does not satisfy the object shape determination condition in the second embodiment, the controller 115 saves neither the block vector image data nor the pixel map data.

Since the tile (2, 2) includes an outline 318 of the circular object 316, the tile (2, 2) is processed similarly to the tile (1, 2), and the block vector image data and the pixel map data are not saved. And since the tile (3, 2) includes an outline 319 of the curve object 317, the tile (3, 2) does not satisfy the object shape determination condition in the second embodiment. Thus, the tile (3, 2) is processed similarly to the tile (1, 2), and the block vector image data and the pixel map data are not saved.

After the tile (3, 2), the next tile for which block vector image data including at least two objects is the tile (1, 3). In the processing of the tile (1, 3), the level-2 data storage/replacement unit 132 is selected, as in the tile (1, 1). The block vector image data for the tile (1, 3) matches the block vector image data for the tile (1, 1), which is stored in the second temporary storage area 113 in the level-2 data storage/replacement unit 132. Thus, the controller 115 performs steps S2002, S2003, S2004, S2005, S2011, S2012, and S2013 in this order. The pixel map data already rendered for the tile (1, 1) is output as data for the tile (1, 3).

The image forming apparatus 122 repeats the above operation until completion of output of data rendered for the tile (4, 5).

As has been described above, according to the second embodiment, a comparison is made between rendering-completed block vector image data and block vector image data to be rendered in the course of forming an image from block vector image data represented by PDL or the like. When the comparison result shows that the two pieces of data match each other, instead of performing a time-consuming analysis and rendering operation of block vector image data, the stored already-rendered data is output. That is, it becomes unnecessary to form an image from the already-rendered block vector image data, thereby realizing high-speed image formation.

Particularly in the case of image formation involving division of one page into a plurality of tiles, the amount of data to be rendered by the image forming unit 108 can be reduced. Thus, the time needed for image formation of one page can be reduced, which is difficult to achieve by known techniques. An image formation operation is generally performed by a hardware processor operating at high speed. Thus, the power consumption can be reduced by stopping image formation when the pieces of block vector image data match each other.

According to the second embodiment, the circular objects 311 and 316 and the curve object 317 are removed from being recorded in the temporary storage areas 113. That is, block vector image data including an object of a simple shape that is likely to be reused is selectively stored in the temporary storage areas 113. Thus, each of the level data storage/replacement units 136 can be constructed using fewer temporary storage areas 113 and comparators 112. Accordingly, reduction in the implemented hardware size and in the power consumption can be expected. In addition, equivalence determination of data for a block that is less likely to be reused can be omitted. Thus, the time needed for equivalence determination can be reduced. Because operations needed for the equivalence determination are reduced in number, a circuit used to perform the equivalence determination can be stopped after the equivalence determination, thereby reducing the power consumption.

According to the embodiments described above, the time needed for image formation can be reduced.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-019264 filed Jan. 27, 2006 and No. 2006-121147 filed Apr. 25, 2006, which are hereby incorporated by reference herein in their entirety.

What is claimed:

1. An image processing apparatus configured to process second vector image data associated with a first block of first vector image data, the apparatus comprising:

a processing unit configured to process the second vector image data;

a determination unit configured to determine whether the second vector image data satisfies a predetermined condition;

a storage unit configured to store a result of processing the second vector image data determined to satisfy the predetermined condition; and an output unit configured to output the result of processing the second vector image data when the second vector image data matches third vector image data associated with a second block of the first vector image data, wherein the determination unit determines whether the number of objects included in the second vector image data satisfies the predetermined condition, and wherein the storage unit stores the result of processing the second vector image data that the number of objects satisfies the predetermined condition.

2. The image processing apparatus according to claim 1, wherein the determination unit determines whether the third vector image data satisfies a predetermined condition, and wherein, when the second vector image data matches the third vector image data to satisfy the predetermined condition, the output unit outputs the result of processing the second vector image data.

3. The image processing apparatus according to claim 1, further comprising a dividing unit configured to divide the first vector image data into the second vector image data and the third vector image data.

4. The image processing apparatus according to claim 1, further comprising an input unit configured to receive input of the second vector image data and the third vector image data, wherein, in accordance with the input of the second vector image data to the input unit, the output unit outputs the result of processing the second vector image data, and wherein, in accordance with the input of the third vector image data matching the second vector image data to the input unit, the output unit outputs the result of processing the second vector image data.

5. The image processing apparatus according to claim 1, wherein the processing unit processes the third vector image data, and wherein, when the second vector image data does not match the third vector image data, the output unit outputs a result of processing the third vector image data.

6. The image processing apparatus according to claim 1, wherein the processing unit processes the third vector image data, wherein the determination unit determines whether the third vector image data satisfies a predetermined condition, and wherein the output unit outputs a result of processing the third vector image data determined by the determination unit not to satisfy the predetermined condition.

7. An image processing apparatus configured to process second vector image data associated with a first block of first vector image data, the apparatus comprising:

a processing unit configured to process the second vector image data;

a determination unit configured to determine whether the second vector image data satisfies a predetermined condition;

a storage unit configured to store a result of processing the second vector image data determined to satisfy the predetermined condition; and an output unit configured to output the result of processing the second vector image data when the second vector image data matches third vector image data associated with a second block of the first vector image data, wherein the determination unit determines whether the shape of an object included in the second vector image data satisfies the predetermined condition, and wherein the storage unit stores the result of processing the second vector image data determined to have the shape of the object which satisfies the predetermined condition.

8. An image processing method for processing second vector image data associated with a first block of first vector image data, the method comprising:

processing the second vector image data;

determining whether the second vector image data satisfies a predetermined condition;

storing a result of processing the second vector image data determined to satisfy the predetermined condition; and outputting the result of processing the second vector image data when the second vector image data matches third vector image data associated with a second block of the first vector image data, wherein it is determined whether the number of objects included in the second vector image data satisfies the predetermined condition, and wherein the result of processing the second vector image data of which the number of objects satisfies the stored predetermined condition.

9. The image processing method according to claim 8, wherein it is determined whether the third vector image data satisfies a predetermined condition, and wherein, when the second vector image data matches the third vector image data determined to satisfy the predetermined condition, the result of processing the second vector image data is output.

10. The image processing method according to claim 8, further comprising dividing the first vector image data into the second vector image data and the third vector image data.

11. The image processing method according to claim 8, further comprising receiving input of the second vector image data and the third vector image data, wherein, in accordance with the input of the second image data, the result of processing the second vector image data is output; and wherein, in accordance with the input of the third vector image data matching the second vector image data, the result of processing the second vector image data is output.

12. The image processing method according to claim 8, wherein the third vector image data is processed, and wherein, when the second vector image data does not match the third vector image data, a result of processing the third vector image data is output.

13. The image processing method according to claim 8, wherein the third vector image data is processed, wherein it is determined whether the third vector image data satisfies a predetermined condition, and wherein a result of processing the third vector image data determined that does not satisfy the predetermined condition is output.

14. An image processing method for processing second vector image data associated with a first block of first vector image data, the method comprising:

processing the second vector image data;

determining whether the second vector image data satisfies a predetermined condition;

storing a result of processing the second vector image data determined to satisfy the predetermined condition; and outputting the result of processing the second vector image data when the second vector image data matches third vector image data associated with a second block of the first vector image data, wherein it is determined in the determination step whether the shape of an object included in the second vector image data satisfies the predetermined condition, and wherein the result of processing the second vector image data that the shape of the object satisfies the stored predetermined condition.

* * * * *